United States Patent [19]

Smith et al.

[11] 4,256,700
[45] Mar. 17, 1981

[54] CATALYTIC CONVERTER WITH AIR TUBE

[75] Inventors: Jack E. Smith, Grand Blanc; David E. Roberts, Flint; John I. Jalbing, Millington, all of Mich.

[73] Assignee: General Motors Corporation, Detroit, Mich.

[21] Appl. No.: 30,088

[22] Filed: Apr. 16, 1979

[51] Int. Cl.³ .................... B01J 8/04; F01N 3/28; F01N 3/30
[52] U.S. Cl. .............................. 422/177; 422/171; 422/172; 422/180
[58] Field of Search ............ 422/171, 172, 176, 177, 422/179, 180; 60/299, 307; 423/213.2, 213.7

[56] References Cited

U.S. PATENT DOCUMENTS

| | | |
|---|---|---|
| 3,729,936 | 5/1973 | Palma et al. ........................ 422/176 |
| 3,740,197 | 6/1973 | Scheitlin et al. .................... 422/176 |
| 3,771,969 | 11/1973 | Scheitlin ............................ 422/172 |
| 3,823,555 | 7/1974 | Cole .................................. 422/177 |
| 4,020,539 | 5/1977 | Vroman ............................. 422/179 |
| 4,049,388 | 9/1977 | ,cheitlin et al. .... Scheitlin et al./172 |

FOREIGN PATENT DOCUMENTS 967012  5/1925  Canada ................................. 422/177
2319606 11/1974  Fed. Rep. of Germany ........... 422/171

OTHER PUBLICATIONS

"Closing in on an Emissions Catalyst", Metals Week; pp. 20 & 21; 2-15-71.

Primary Examiner—Bradley Garris
Attorney, Agent, or Firm—R. L. Phillips

[57] ABSTRACT

In a catalytic converter, an air tube is permanently fixed and sealed at an open end thereof between two flanges on one side of a clamshell type housing enclosing reducing and oxidizing catalyst means. The tube extends between the catalyst means and has a closed end slidably mounted oetween flanges of the housing on the opposite side thereof internal of where these flanges are joined. The tube which has holes for delivering air into the passing exhaust gases prior to reaching the oxidizing catalyst is thus firmly supported by the housing while relative expansion with heat is permitted therebetween and without interrupting the sealed integrity of the housing flanges at the closed end of the tube.

4 Claims, 8 Drawing Figures

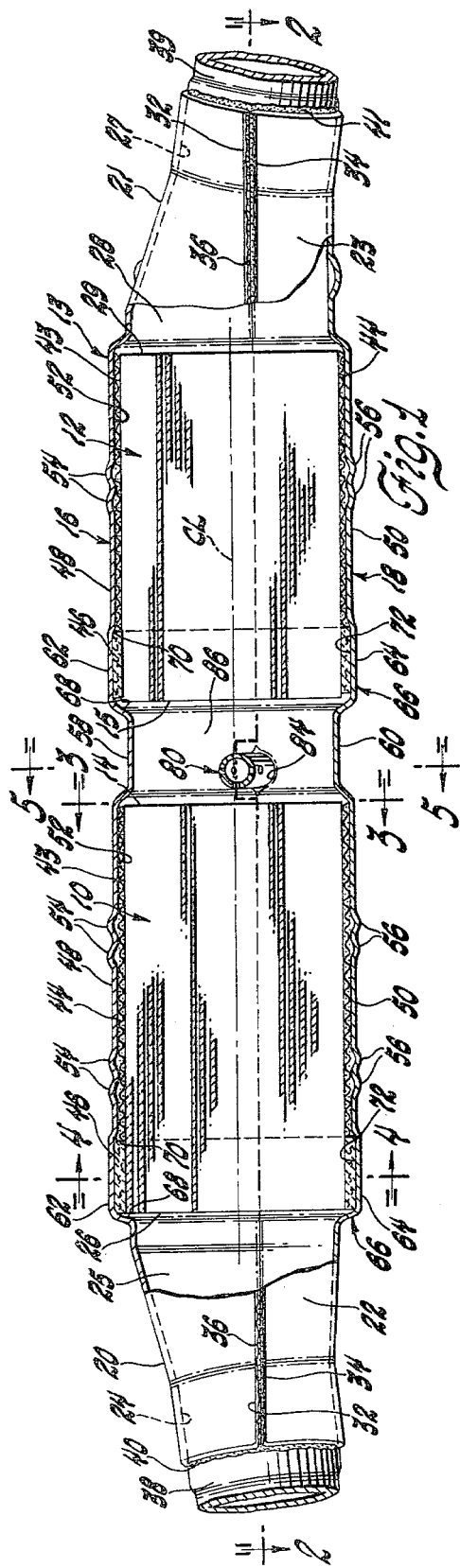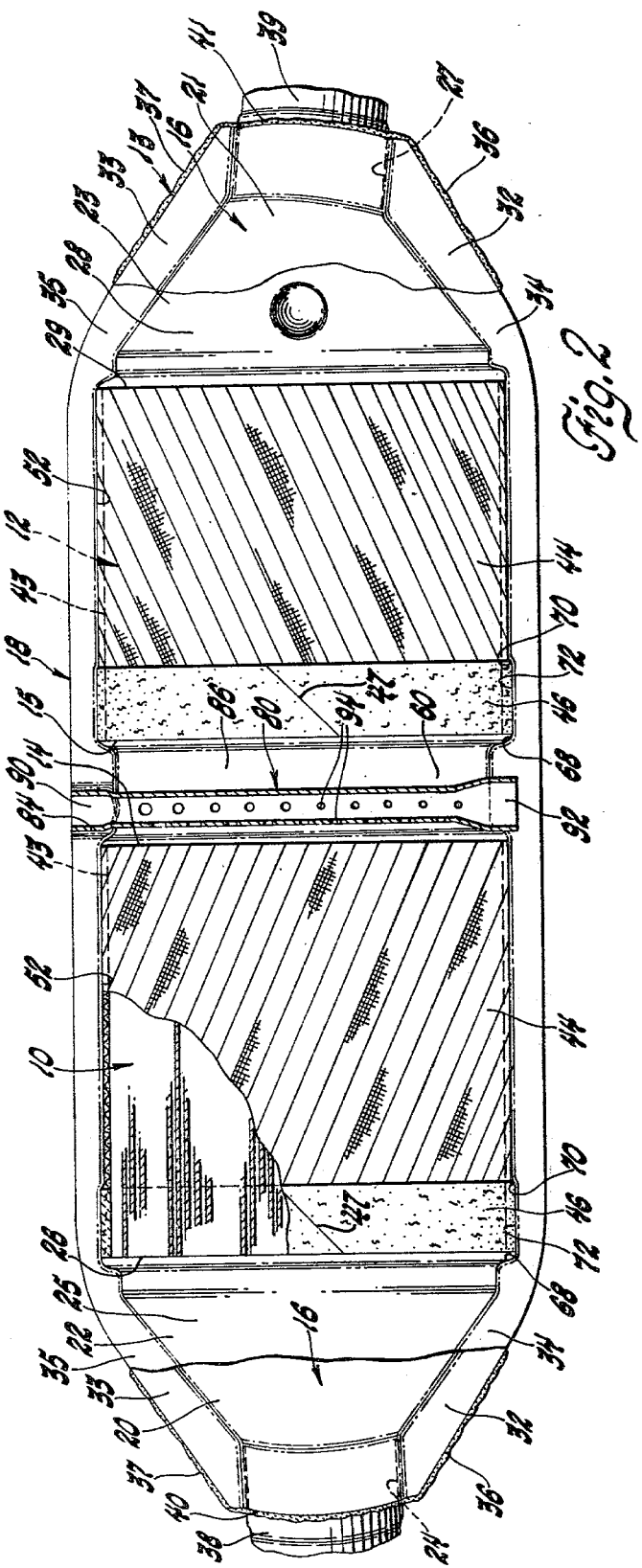

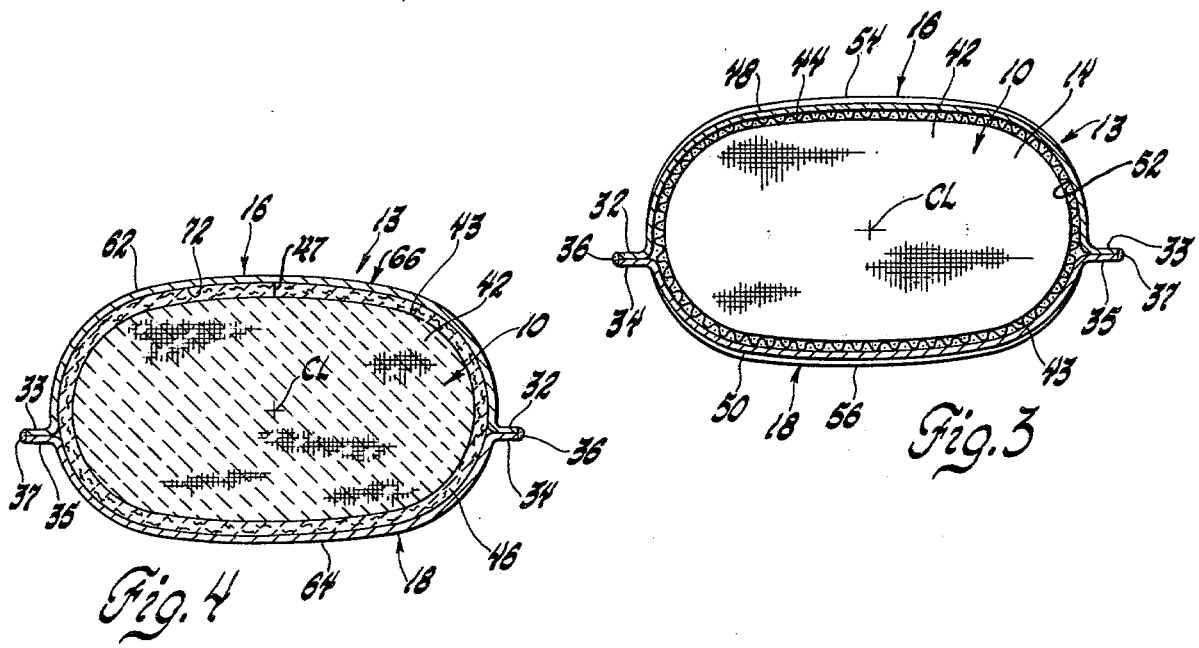
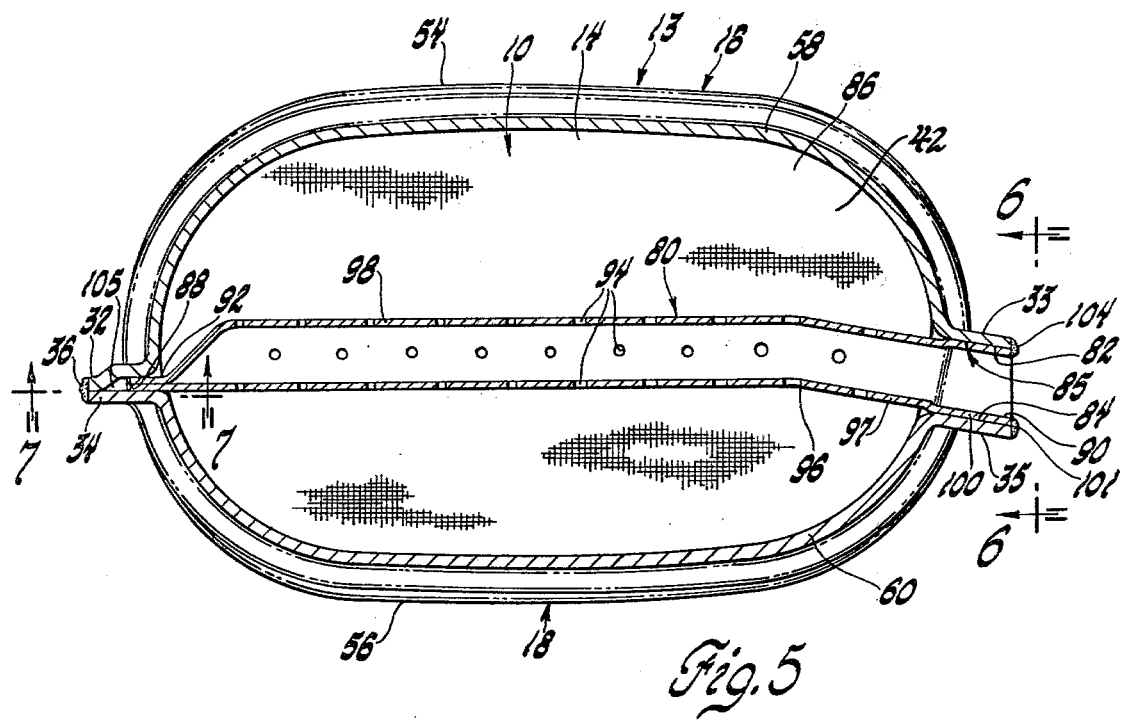

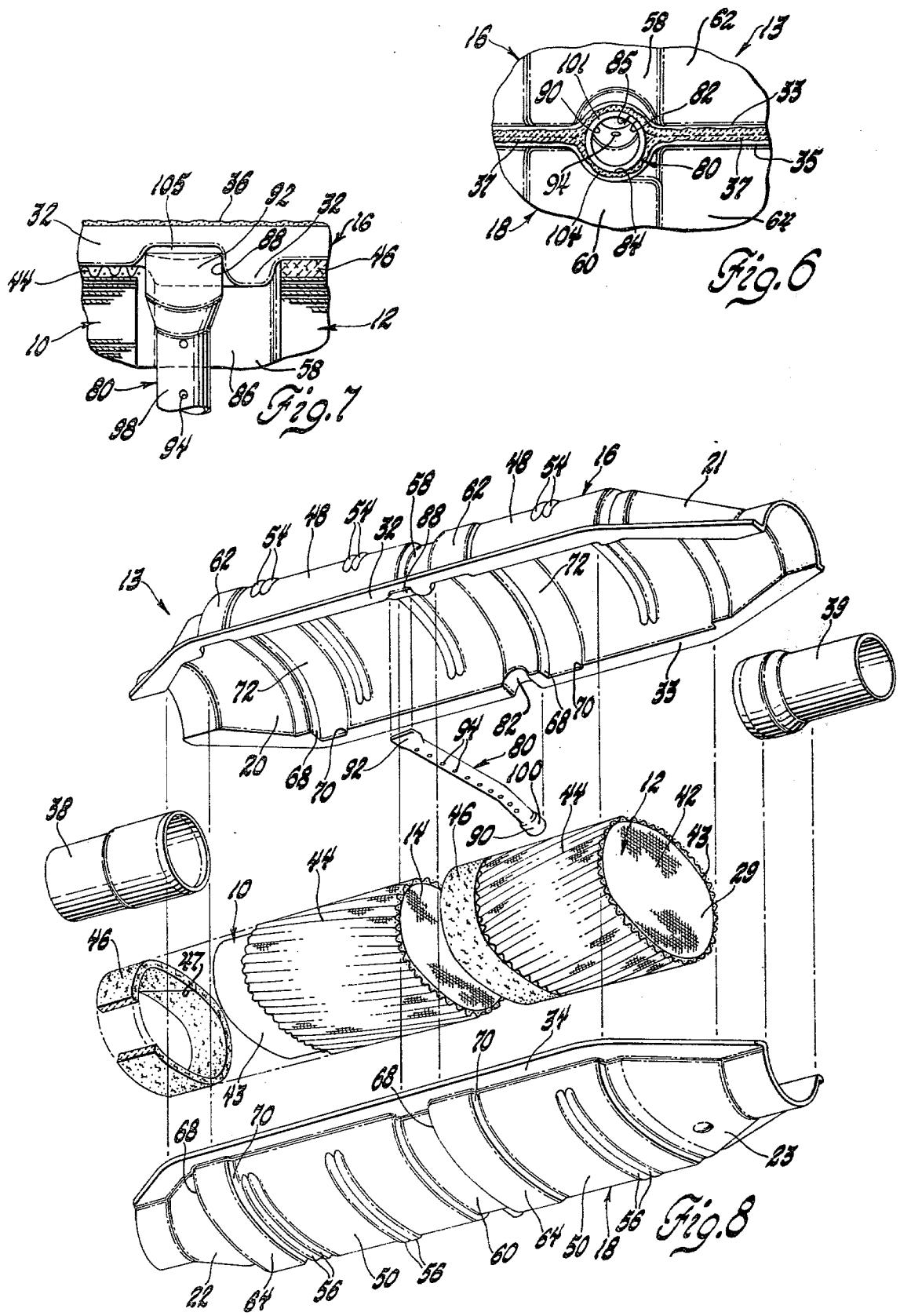

CATALYTIC CONVERTER WITH AIR TUBE

This invention relates to catalytic converters for internal combustion engine exhaust gases and more particularly to such converters of the type having catalyst means mounted in a sheet metal housing with air injected through the housing into the exhaust gases for oxidation induced by an oxidizing catalyst.

In catalytic converters of the above type, it is known that the air may be injected by an air tube. However, the tube must remain sealed to the converter housing at its place of entry yet be firmly supported within and by the housing without having its thermal expansion and/or that of the housing interfere with its integrity and the sealed integrity of the housing at the place of tube entry. For example, if a simple, straight or substantially straight tube is attempted to be used and is fixed within the housing and where its thermal expansion does not correspond with that the housing which is typically the case, it may be stretched or compressed beyond an acceptable degree and/or its sealed joint at the housing may be overstressed.

The present invention allows the use of such a simple air tube without these problems in a converter of the type having oxidizing catalyst means mounted in a housing which is comprised of two sheet metal shell members having mating flanges which are welded together and extend along opposite sides of the housing and alongside the catalyst means. This is accomplished with very simple modifications to the housing consisting of (a) forming an opening between the shell member flanges on one side of the housing which opens to the space within the housing adjacent the oxidizing catalyst means and, (b) forming a pocket between the shell member flanges on the opposite side of the housing inward of where these flanges are welded. A straight or substantially straight air tube extends through the thus formed housing opening and across the space within the housing adjacent the oxidizing catalyst means to the thus formed pocket on other side. The air tube has an open end external of the housing and is provided with a closed end within the housing and further has a plurality of holes spaced along the length thereof within the housing for delivering air to the exhaust gases for enhanced oxidation by the oxidizing catalyst. An external weld is provided between the edge of the open end of the air tube and the shell member flanges forming the opening therefor whereby the tube is permanently sealingly secured at this end to the housing external thereof. On the other hand, the pocket opens only to the space within the housing between the catalyst means and tightly but slidably supports the closed end of the air tube. As a result, the air tube is firmly supported by the opposite sides of the housing but yet is free to linearly expand with heat within the housing and the housing is also free to expand relative to the closed end of the air tube while carrying the permanently attached open end of the tube along therewith. Furthermore, there is only one sealed joint between the air tube and housing and this is between only two of its sealed flanges leaving the other two flanges undisturbed at their sealed juncture.

These and other objects, advantages and features of the present invention will become more apparent from the following description and drawings in which:

FIG. 1 is a side elevational view with parts broken away of a catalytic converter embodying the present invention.

FIG. 2 is a view taken along the line 2—2 in FIG. 1.

FIG. 3 is a cross-sectional view taken along the line 3—3 in FIG. 1.

FIG. 4 is a cross-sectional view taken along the line 4—4 in FIG. 1.

FIG. 5 is an enlarged cross-sectional view taken along the line 5—5 in FIG. 1.

FIG. 6 is a fragmentary view taken along the line 6—6 in FIG. 5.

FIG. 7 is a fragmentary view taken along the line 7—7 in FIG. 5.

FIG. 8 is an exploded view of the converter in FIG. 1.

Referring to the drawings, there is shown a catalytic converter embodying the present invention for use in a vehicle to purify the exhaust gases from an internal combustion engine. The converter generally comprises a pair of monoliths 10 and 12 which are mounted end-to-end in a sheet metal housing 13 of the clamshell type with their respective inner ends 14 and 15 facing each other. The housing 13 consists of a pair of shell members 16 and 18 which cooperatively enclose the peripheral sides of the monoliths and in addition, have integrally formed funnel portions 20, 21 and 22, 23 respectively, at opposite ends thereof. The respective funnel portions 20 and 22 of the shell members 16 and 18 cooperatively form a circular cylindrical opening 24 in one end of the housing and also an internal passage 25 which diverges outwardly therefrom to expose this opening to the entire outer end 26 of monolith 10. The other funnel portions 21 and 23 cooperatively form a circular cylindrical opening 27 in the other end of the housing and also an internal passage 28 which diverges outwardly therefrom to expose this opening to the entire outer end 29 of the other monolith 12. In addition, the respective shell members 16 and 18 have co-planar flanges 32, 33 and 34, 35 which extend along opposite sides and between the ends thereof. The respective flanges 32, 33 mate with the flanges 34, 35 and are permanently sealingly welded together by separate welds 36 and 37 along the edges thereof.

Furthermore, for aligning the converter in an under-floor vehicle installation in the exhaust system, it will be observed that the housing openings 24 and 27 are slightly angled downward as viewed in FIG. 1 and also slightly angled sideways as viewed in FIG. 2. Also, the longitudinal split line or plane of the converter housing at its flanges is offset downward from its centerline CL as viewed in FIGS. 1, 3 and 4. This offset is such that the lower shell member 18 is shallow as compared with the upper shell member 16 and that coupled with the downward angling of the openings results in the bottom point of both the housing openings being slightly offset upward from the bottom-most point of the converter while the top points of these openings are offset a substantial distance downward from the top-most point of the converter. The housing's cylindrical openings 24 and 27 receive a connector pipe 38 and 39 respectively, and these pipes are sealingly fixed about their periphery to the edge of the respective housing openings by continuous separate welds 40 and 41 and are adapted to connect the converter in the engine's exhaust system so that the exhaust gases enter to the monolith 10 and exit from the other monolith 12.

The monoliths 10 and 12 are constructed of a frangible material such as ceramic and are extruded with an identical honeycomb cross-section 42 and an oval cylindrical periphery 43 as shown in FIG. 3, such oval shape providing for a low converter profile as compared to width for underfloor vehicle installation where accommodating space height is very limited. The monoliths 10 and 12 are coated with a suitable 3-way reduction or oxidation catalyst for purifying the exhaust gases entering through the opening 24 serving as the housing inlet and prior to exiting the opening 27 serving as the housing outlet by reduction and oxidation processes as is well-known in the art.

The housing 13 consisting of the shell members 16 and 18 is preferably constructed of stainless steel sheet or some other high temperature non-corrosive metal sheet and thus has a substantially higher rate of thermal expansion than that of the ceramic monoliths 10 and 12. As a result, the housing expands away from the monoliths as the converter heats up and some provision must be made for both supporting and sealing the monoliths to prevent fracture thereof and bypassing or internal leakage of the exhaust gases past their interior.

In the converter shown, each of the monoliths 10 and 12 is separately supported by both a cylindrical wire mesh sleeve 44 woven from stainless steel wire and a cylindrical sleeve 46 of resilient heat expandable intumescent material such as that known by the tradename Interam and made by Technical Ceramics Products Division, 3M Company. The wire mesh sleeve 44 and intumescent sleeve 46 cooperatively encompass the entire cylindrical surface 43 of the respective monoliths with the axial length of the intumescent sleeve being substantially less than that of the wire mesh sleeve. For example, in the converter shown, the axial length of the intumescent sleeve is about one-sixth that of the wire mesh sleeve for the monolith 10 while this fraction is increased slightly to one-fifth for the monolith 12 because of the preference to use the same axial width intumescent sleeve with the monolith 12 which is made axially shorter than the monolith 10 to provide adequate space for the air tube installation described later. Furthermore, for convenience of manufacture both the wire mesh sleeve and the intumescent sleeve are made from sheet stock and are thus split with the former split longitudinally and the latter split diagonally along a straight line 47.

To then make full use of these different type monolith supports, the respective housing shell members 16 and 18 are formed with intermediate partial-cylindrical portions 48 and 50 which are partial-oval in cross-section as viewed in FIG. 3 and cooperatively provide on their interior side an oval cylindrical surface 52 which corresponds to and is spaced radially outward from the surface 43 of the respective monoliths so as to define a cylindrical space therebetween in which the wire mesh sleeve 44 is compressively mounted separate from its adjacent intumescent sleeve. For increased housing stiffness to resist bulging out in this area on converter heat up, the respective housing portions 48 and 50 have integrally formed pairs of axially spaced, laterally extending ribs 54 and 56. And for increased housing stiffness between the two monoliths, the respective shell members 16 and 18 are further formed with partial-annular rib portions 58 and 60 which extend slightly radially inward of the edges of the inner ends 14 and 15 of the monoliths.

The wire mesh sleeve 44 prior to assembly has a radial thickness substantially larger than the radial width of the wire mesh accommodating space so that when the wire mesh sleeve is first mounted about its respective monolith as shown in FIG. 8 and this subassembly is then clamped between the shell members 16 and 18, the wire mesh will be compressed a certain amount. This spring compression is determined so that the monolith is resiliently radially supported and restrained against relative axial movement in the housing by the wire mesh sleeve at atmospheric temperature conditions and then when the converter is heated up during use in the vehicle and as the housing expands radially away from the monolith, the wire mesh expands therewith to retain such resilient radial support and axial location of the monolith within the housing. For example, in an actual construction of the converter shown and with the converter housing at atmospheric temperature this effect was provided when the housing had an average radial growth with heat of about 0.020 inches by a radial spacing between the monolith and the housing of about 0.090 inches and compression of the wire mesh sleeve within this space from a preassembly radial thickness of about 0.250 inches.

On the other hand, the intumescent sleeve 46 which has a rectangular cross-section as seen in FIG. 1 is intended to swell on first converter heat up to provide tight sealing but has less resiliency and compliance than the wire mesh sleeve 44 for support of the monolith. Its manner of mounting including the housing sizing therefor is substantially different from that of the wire mesh sleeve previously described so that it is effective to provide both tight sealing between the housing and monolith while also assisting the wire mesh sleeve in radially supporting and axially retaining the monolith as the housing expands with heat. This is accomplished by forming radially outwardly projecting partial-cylindrical portions 62 and 64 integral with the respective shell members 16 and 18. These housing portions 62 and 64 have a partial-oval cross-section as seen in FIG. 4 and cooperatively provide a radially ribbed cylindrical portion 66 integral with the housing extending about the cylindrical surface 43 of the respective monoliths adjacent their inlet end and adjoining the cylindrical housing portion 48, 50 extending about the wire mesh sleeve. The two radial rib portions 68 and 70 of the cylindrical portion 66 radially stiffen the housing at the inlet end of the respective monoliths and also partially axially confine an interior cylindrical surface 72 on the interior side of the cylindrical portion 66 which corresponds to and is spaced radially outward from the surface 43 of the respective monoliths. The interior cylindrical housing surface 72 cooperates with the cylindrical surface 43 of the monolith to provide a radially confined annular seal accommodating space therebetween having partial axial confinement at the housing as provided by the radial rib portions 68 and 70.

The seal accommodating space differs from the wire mesh sleeve accommodating space in having a radial width dimension prior to converter heat up that is substantially larger than that of the space for the wire mesh sleeve but is only slightly smaller than the radial thickness of the intumescent sleeve 46. For example, in the previously described actual construction of the converter shown, the seal accommodating space was then provided with a radial width dimension of about 0.130 inches as compared to the 0.090 inches space for the wire mesh and the radial thickness of the intumescent sleeve 46 as will now be discussed. The intumescent sleeve 46 which has an expansion rate substantially greater than that of the housing is determined to have a preassembly radial thickness substantially smaller than that of the wire mesh sleeve but only slightly larger by a predetermined amount than the radial width dimension of the seal accommodating space so as to prevent fracturing of the monolith at assembly while allowing sufficient bulk density of this material in the seal accommodating space for subsequent support and sealing of the monolith as the converter housing expands with heat. For example, in the previously described actual construction of the converter shown, the intumescent sleeve 46 was then provided with a preassembly radially thickness of about 0.185 inches which could freely radially expand with heat to about 0.500 inches if not constrained as compared to the 0.130 inches space in which it is to be clamped and the average radial housing growth of 0.020 inches that occurs with heat.

The intumescent sleeve 46 is subassembled on each of the monoliths like the wire mesh sleeve 44 as shown in FIG. 8 and together therewith is received between the shell members 16 and 18. However, because of the difference in the preassembly radial thickness of the wire mesh sleeve 44 and the intumescent sleeve 46 at each of the monoliths as described above, the latter is only tightly received rather than substantially compressed between the housing and the monolith during assembly of the converter. As a result, the intumescent sleeve 46 at each of the monoliths is thereby prevented from transmitting clamping forces from the shell members large enough to fracture the monolith while the wire mesh sleeve is being compressed its required amount on bringing together of the shell members' flanges. With the converter thus assembled and then on its first heat up in the vehicle, the intumescent sleeve 46 at each of the monoliths swells and is resisted by the stiffened housing portion 66 and is thereby caused to exert substantial restraining pressure between the stiffened housing and the monolith without fracturing the monolith and without causing bulging of the heated housing because of such increased radial stiffening of the latter. Thereafter, the intumescent sleeve 46 remains effective to provide tight sealing between the housing and the monolith at the inlet end thereof while also remaining sufficiently resilient to assist the adjacent wire mesh sleeve 44 in providing resilient radial support of the monolith and also relative axial location thereof as the housing expands with heat.

The catalytic converter structure thus far described and without air injection is like that disclosed in co-pending U.S. patent application Ser. No. 30125, filed 4-16-79 entitled Catalytic Converter Having A Monolith With Support and Seal Means Therefor and assigned to the assignee of this invention. In such a converter having dual catalyst means, it is known that the oxidation process can be enhanced by injecting and mixing air with the exhaust gases prior to their exposure to the oxidizing catalyst.

According to the present invention, such air injection is easily accomplished in this type converter where the monolith 12 has the oxidation catalyst by the addition of a simple air tube 80 of circular cross-section and simple modifications of the shell members 16 and 18 between the two monoliths 10 and 12 as shown in FIGS. 1, 2 and 5-8. The modifications of the shell members 16 and 18 consist of forming a semi-cylindrical channel 82 and 84 in and across the interior side of the respective shell member flanges 33 and 35 on one side of the housing. The channels 82 and 84 cooperatively define a cylindrical opening 85 therebetween as best shown in FIGS. 5 and 6 which opens to the space 86 within the housing between the outlet end 14 of monolith 10 and the inlet end 15 of monolith 12. Then opposite the opening 85, there is formed a tube receiving recess 88 in the interior side of only the upper shell member flange 32 on the opposite side of the housing as best seen in FIGS. 5 and 7. The recess 88 is formed with three sides and a flat bottom and is located inward of where the upper and lower shell member flanges 32 and 34 are joined by the weld 36 and is inwardly open to the housing space 86.

The air tube 80 is, like the housing, made of stainless steel or some other high-temperature non-corrosive metal and has an open end 90 mounted in the thus formed housing opening 85. The air tube 80 extends across the space 86 within the housing between the two monoliths 10 and 12 and has its opposite end 92 both closed and received in the recess 88 as described in more detail later. Furthermore, the air tube 80 has a plurality of holes 94 spaced thereabout and therealong for injecting air into the passing exhaust gases. For even distribution of this air in the up and down direction as viewed in FIG. 5, both the air tube and the housing opening therefor are made to accommodate for the downward offset split line of the shell members at their flanges so that the air tube extends horizontally across the housing space 86 mid-height and thus centrally thereof. This is accomplished by the housing opening 85 being formed with a slight downward angle to horizontal to accommodate angled entry of the tube in an upward direction away from the flanges on the opposite side. Then within the housing, the air tube 80 has a slight bend 96 joining its angled straight entry portion 97 with a straight horizontal portion 98 which extends horizontally across the space 86 and through the housing centerline CL at right angles thereto.

The inlet end of the tube has an enlarged diameter portion 100 which closely fits in the housing opening 85 and is adapted to receive an air delivery pipe, not shown, delivering the air for the enhanced oxidation. The edge 101 of the open end 90 of the air tube aligns with the edges of the shell member flanges 33 and 35 forming the opening 85 thereabout and these edges and thus the air tube are permanently sealingly fixed by a continuous weld 104 therebetween external of the housing.

On the other hand, the opposite end 92 of the air tube is neither permanently fixed to the housing nor open. Instead, the tube end 92 is closed by flattening thereof into a rectangular profile which is tightly but slidably received with substantial end clearance 105 in the pocket means formed internal of the weld 36 by the recess 88 in the interior side of the upper housing shell member flange 32 cooperating with the opposite facing interior side of the lower shell member flange 34 on this side of the housing. Furthermore, it will be observed that the flattened end 92 is offset downward from the center-line of the horizontal tube portion 98 to support the elevation of the latter in compensating for the offset split line of the housing at its flanges.

Thus, the air tube 80 is permanently and sealingly fixed at its open end 90 to one side of the housing between two of its flanges by external welding and thus without requiring a hole through one of the shell members where the wall would be relatively weak. On the other hand, the tube's closed end 92 is slidably supported between the two flanges on the opposite side of the housing interior of their weld and thus without interrupting their sealed integrity while taking advantage of their stiff support so as not to require either an additional support on one of the shell members or an additional joint in the housing that must be sealed. As a result, the air tube is free to expand with heat along its length in the end clearance 105 of the recess 88 and relative to the housing while remaining firmly supported thereby at its opposite ends. Alternatively, that side of the housing slidably supporting the closed end of the air tube is free to expand with heat relative thereto while the opposite housing side in expanding with heat carries the tube which is fixed thereto along therewith. Furthermore, this air injection arrangement is easy to assemble along with the monoliths as is seen in FIG. 8 by simply arranging the air tube between the shell member flanges prior their mating and welding. In addition, by assembling the converter upside down, the closed end 92 of the air tube may then be layed in and thus located by the pocket recess 88 therefor in the upper shell member flange 32 prior to bringing the two shell members together.

While the preferred embodiment of the invention has been illustrated in use in a catalytic converter having a pair of catalyst coated monoliths, it will be appreciated that the invention may also be adapted to a catalytic converter having single oxidizing catalyst means with the air tube located either upstream or downstream thereof. Furthermore, the converter could be of the type having catalyst coated beads retained in a bed within a housing of the clamshell type having flanges which can be similarly modified to accommodate the air tube adjacent to the catalyst bed. It will also be appreciated that modifications of the air tube and the housing support therefor are in the spirit and scope of the invention. For example, the pocket for slidably supporting the closed end of the tube could be formed by opposing recesses in the interior side of the two flanges where, for example, a much larger cross-section is provided at the closed end of the air tube. Furthermore, it will be appreciated that in the embodiment shown the air tube is bent and the housing opening inclined for angled tube entry for mid-location of the air tube in the exhaust gases because of the offset split line of the housing. However, the air tube could be straight with the housing opening not angled where the resulting offset of the air tube is tolerable or where the split line of the housing at its flanges is on center with the air injection space in the housing. Furthermore, the open end of the tube terminates at the edges of the housing flanges defining the opening for the tube to permit easy edge welding thereof together with the welding of the remaining edges of these flanges. However, the air tube could be extended outwardly of these housing flanges where such extension for connection to an air delivery pipe is more desirable than the simple welding thereof described above.

Thus, the above described preferred embodiment is intended to be illustrative of the invention which may be modified within the scope of the appended claims.

The embodiments of the invention in which an exclusive property or privilege is claimed are defined as follows:

1. In a catalytic converter for internal combustion engine exhaust gases and of the type having oxidizing catalyst means mounted in a housing wherein the housing is comprised of two sheet metal shell members having mating flanges which extend along opposite sides thereof and alongside the oxidizing catalyst means and are sealingly welded together and wherein air is injected into the housing for oxidation of the exhaust gases: the improvement comprising in combination, an opening formed between the shell member flanges on one side of the housing, an air tube extending through said opening and across the interior of the housing, said air tube having a closed end within the housing, said air tube further having a plurality of holes for delivering air into the exhaust gases in the housing, an external weld between said air tube and the shell member flanges forming said opening whereby the air tube is permanently sealingly secured to the housing external thereof, and pocket means formed between the interior sides of the shell member flanges on the opposite side of the housing inward of where these shell member flanges are welded, said pocket means being sealed by the associated flange weld and open to the interior of the housing for slidably supporting said closed end of the air tube between the shell member flanges on said opposite side whereby the air tube and the housing are free to expand with heat relative to each other while the air tube remains firmly supported at the housing sides and whereby the sealed integrity of the housing is undisturbed by the closed end of the air tube.

2. In a catalytic converter for internal combustion engine exhaust gases and of the type having oxidizing catalyst means mounted in a housing wherein the housing is comprised of two sheet metal shell members having mating flanges which extend along opposite sides thereof and are sealingly welded together and wherein air is injected into the housing for oxidation of the exhaust gases: the improvement comprising in combination, an opening formed between the shell member flanges on one side of the housing, an air tube extending through said opening and across the interior of the housing, said air tube having a closed end within the housing, said air tube further having a plurality of holes for delivering air into the exhaust gases in the housing, an external weld between said air tube and the shell member flanges forming said opening whereby the air tube is permanently sealingly secured to the housing external thereof, and a recess formed in only one of the interior sides of the shell member flanges on the opposite side of the housing inward of where these shell member flanges are welded, said recess being sealed by the associated flange weld and open to the interior of the housing for slidably receiving said closed end of the air tube between the shell member flanges on said opposite side whereby the air tube and the housing are free to expand with heat relative to each other while the air tube remains firmly supported at the housing sides and whereby the sealed integrity of the housing is undisturbed by the closed end of the air tube.

3. In a catalytic converter for internal combustion engine exhaust gases and of the type having oxidizing catalyst means mounted in a housing wherein the housing is comprised of two sheet metal shell members having mating flanges which extend along opposite sides thereof and are permanently sealingly welded together and wherein air is injected into the housing for oxidation of the exhaust gases: the improvement comprising in combination, an opening formed between the shell member flanges on one side of the housing, an air tube extending through said opening and across the interior of the housing, said air tube having a closed flattened end within the housing, said air tube further having a plurality of holes for delivering air into the exhaust gases in the housing, an external weld between said air tube and the shell member flanges forming said opening whereby the air tube is permanently sealingly secured to the housing external thereof, and a flat bottom recess formed in only one of the interior sides of the shell member flanges on the opposite side of the housing inward of where these shell member flanges are welded, said recess being sealed by the associated flange weld and open to the interior of the housing for slidably receiving said closed flattened end of the air tube between the shell member flanges on said opposite side whereby the air tube and the housing are free to expand with heat relative to each other while the air tube remains firmly supported at the housing sides and whereby the sealed integrity of the housing is undisturbed by the closed flattened end of the air tube.

4. In a catalytic converter for internal combustion engine exhaust gases and of the type having oxidizing catalyst means mounted in a housing wherein the housing is comprised of two sheet metal shell members having mating flanges which are sealingly welded together and extend along opposite sides thereof but are offset to one side of the centerline of the housing and wherein air is injected into the housing for oxidation of the exhaust gases: the improvement comprising in combination, an opening formed between the shell member flanges on one side of the housing and angled away from the flanges on the opposite side of the housing, an air tube having a first straight tube portion extending through said opening, said air tube having a second straight portion within the housing angled relative to said first straight portion so as to extend centrally across the interior of the housing, said air tube having a plurality of holes for delivering air into the exhaust gases in the housing, an external weld between said first straight portion and the shell member flanges forming said opening whereby the air tube is permanently sealingly secured to the housing external thereof, pocket means formed between the interior sides of the shell member flanges on said opposite side, said pocket means being located inward of where the shell member flanges on said opposite side are welded and thereby sealed and being open to the interior of the housing, and said second straight portion having a closed end offset from its centerline slidably received by said pocket means whereby the second straight portion is centrally supported in the housing while the air tube and the housing are free to expand with heat relative to each other and whereby the sealed integrity of the housing is undisturbed by the closed end of the air tube.

* * * * *